United States Patent [19]

Puri

[11] Patent Number: 4,753,768
[45] Date of Patent: Jun. 28, 1988

[54] REACTOR CAVITY POOL SEAL

[75] Inventor: Arun Puri, Simsbury, Conn.

[73] Assignee: Nuclear Energy Services, Inc., Danbury, Conn.

[21] Appl. No.: 541,032

[22] Filed: Oct. 12, 1983

[51] Int. Cl.⁴ .................... F16J 15/46; G21C 13/00
[52] U.S. Cl. .................... 376/205; 277/34; 277/34.3; 376/203; 138/89
[58] Field of Search .............. 277/34.3, 34; 376/203, 376/205; 138/89

[56] References Cited

U.S. PATENT DOCUMENTS 4,214,760 7/1980 Godfrey ..................... 277/34.3

Primary Examiner—Allan N. Shoap
Attorney, Agent, or Firm—Charles J. Brown

[57] ABSTRACT

An improvement in a reactor cavity pool seal which includes a seal plate between the reactor and the cavity wall and an inflatable annular seal, wherein the inflatable seal operates between a seal ring and bearing plate which are elements in addition to the seal plate and cavity wall, thereby eliminating problems of eccentricity and clearance.

7 Claims, 1 Drawing Sheet

REACTOR CAVITY POOL SEAL

BACKGROUND OF THE INVENTION

During refueling of nuclear reactors a canal above the reactor vessel is filled with water submerging the interior of the reactor. To limit radioactive contamination it is imperative that none of the water above and within the vessel be allowed to penetrate the lower space around the exterior of the reactor vessel and within the reactor cavity. Since this annular space may not be permanently sealed it has been recognized that temporary reactor cavity pool seals must be provided during the refueling process. An improvement over earlier seals is disclosed in U.S. Pat. No. 4,214,760. The present invention is a specific advance over the structure disclosed in that patent.

The prior art structure referred to includes a removable annular seal plate which has an upper surface substantially coplanar with both a cavity wall ledge and an upper surface on a flange disposed about the reactor vessel. The seal plate also has a circular edge surface which is spaced in opposition to a circular face either beneath that ledge and/or beneath the reactor vessel flange upper surface. Annular inflatable means are provided to effect a seal between the spaced circular surface and the face.

What is referred to above as the cavity ledge is typically a metal ring embedded within the cylindrical concrete wall surrounding the reactor vessel. This concrete wall extends straight downwardly from the inner periphery of the embedment ring. The flange surrounding the reactor vessel is nominally, but not necessarily exactly, concentric with the embedment ring. If they are eccentric to any significant degree, say more than one or two inches off-center, then the structure disclosed in U.S. Pat. No. 4,214,760 will no longer be servicable, because the annular inflatable means will not make effective sealing engagement between the spaced circular surface and face.

Another disadvantage of the structure of the aforementioned prior art patent is that the inflatable means sealing directly against the embedment ring requires for proper operating clearance a circumferential notch in the concrete cavity wall immediately below the ring.

It is the principal purpose of the present invention to improve on the structure of the aforementioned patent so that it is no longer sensitive to the parameter of eccentricity. If due to settling of the building structure or for any other reason the embedment ring and reactor vessel flange become eccentric beyond otherwise acceptable limits, the structure of the present invention nonetheless allows the inflatable seal to operate between opposed sealing surfaces which are exactly concentric. Also no notching of the concrete cavity wall is required in the arrangement of the present invention.

SUMMARY OF THE INVENTION

A reactor cavity pool seal is provided in accordance with the invention wherein a removable annular seal plate has an upper surface substantially co-planar with one of a cavity wall ledge and a reactor flange upper surface and has a circular edge surface spaced in opposition to the circular face beneath said one of the ledge and flange upper surface. Annular inflatable means are provided in effecting a seal between the spaced circular surface and the face. The improvement of the invention comprises a flat seal ring on the plate and an annular bearing plate of the same thickness as the seal ring on one of the ledge and flange upper surface. The seal ring and bearing plate define opposed spaced circular respective inner and outer sealing surfaces. The seal ring is fixed and sealed to the plate and the bearing plate is fixed and sealed to said one of the ledge and flange upper surface such that the inner and outer sealing surfaces are concentric. The annular inflatable means are located between and operate against the opposed inner and outer sealing surfaces.

In a preferred form of the invention the removable annular seal plate has an upper surface substantially co-planar with the cavity wall ledge and a convex circular edge surface of the seal plate is spaced in opposition to a concave circular face beneath that ledge. In this form the annular bearing plate is mounted on the ledge.

DESCRIPTION OF PREFERRED EMBODIMENT

Figure 1:
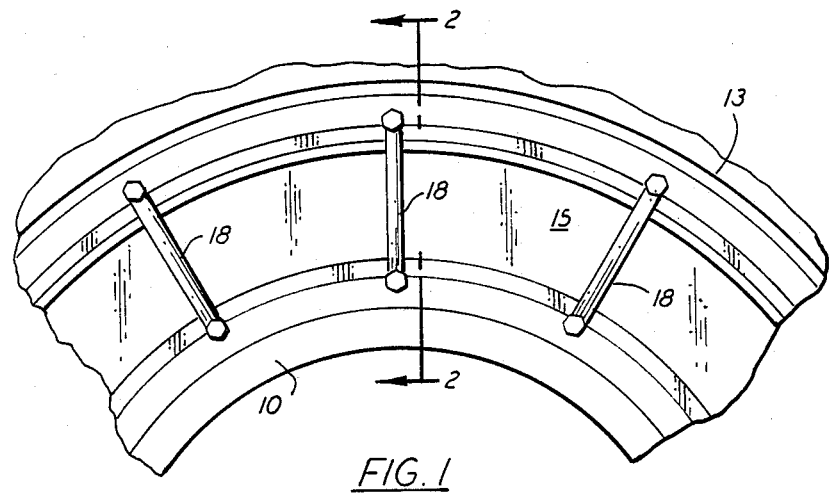
FIG. 1 is an enlarged fragmentary plan view showing the reactor cavity pool seal of the invention.
Figure 2:
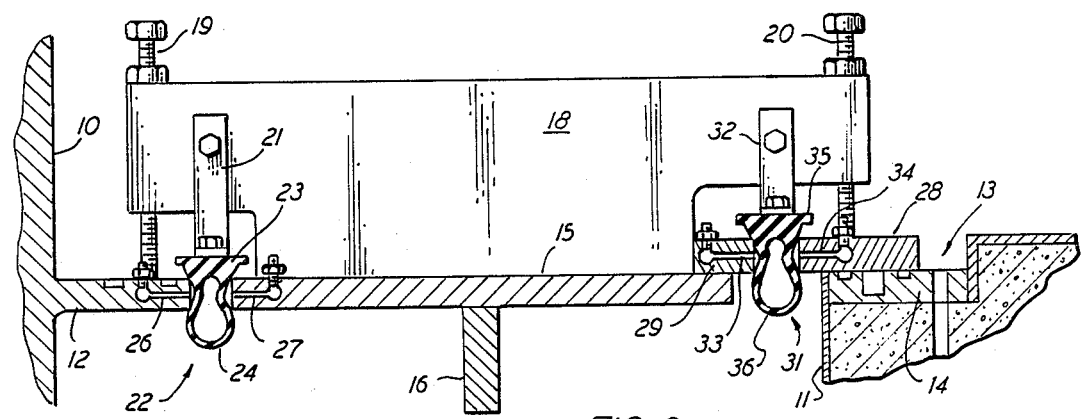
FIG. 2 is an enlarged fragmentary section taken laterally across the seal plate of the invention along line 2—2 of FIG. 1.
Figure 3:
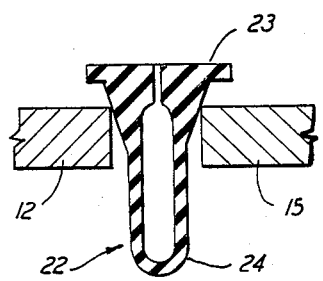
FIG. 3 is an enlarged fragmentary section showing the inflatable seal in a deflated state.
Figure 4:
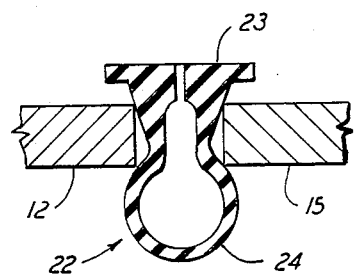
FIG. 4 is a view similar to FIG. 3 showing the seal in an inflated state.

Reference may be had to the aforementioned U.S. Pat. No. 4,214,760 for the general environment in which a reactor cavity pool seal of the subject type is concerned. As shown in FIG. 1 and to some extent in FIG. 2, this environment includes a reactor vessel 10 located concentrically within a cavity 11. A horizontal flange 12 extends concentrically from the reactor vessel 10. Opposite the flange 12 and at the same level is a cavity ledge 13 defined by the flat upper surface of an embedment plate 14, which also has an inside surface flush with the wall of the reactor cavity 11. This space between the flange 12 and the embedment plate 14 defining the ledge 13 must remain open during normal reactor operation and yet it must be sealed during refueling to provide a continuous canal floor for the tons of water flooded above the level over the top of and down within the rector vessel.

The principal problem facing the prior art is that there can be no assurance that the flange 12 on the reactor vessel 10 is sufficiently concentric with the embedment plate 14 defining the cavity ledge 13.

An annular seal plate 15 is provided between the flange 12 and the embedment plate 14. The seal plate 15 may be brought to the site in sections and welded into its final ring shape, as described in the aforementioned patent. A lower stiffening rib 16 may extend downwardly from the center of the seal plate 15. A plurality of standoffs 18 are provided (three are shown in FIG. 1) which span the space between the flange 13 and the embedment plate 14 and the seal plate 15 is suspended from the standoffs. At the opposite ends of each standoff are a pair of leveling screws 19 and 20. The leveling screw 19 rests upon the upper surface of the flange 12. At the same end of the standoff 18 is a bracket 21 which supports an inner inflatable seal 22. The seal 22 includes an enlarged tapered first end 23 and an inflatable tubular second end 24. The structure and operation of such a seal is described in detail in U.S. Pat. No. 4,214,760. In general, when the lower end 24 is inflated the upper end 23 is pulled into tight contact with the upper edges of the flange 12 and seal plate 15 respectively. The lower edges of the flange 12 and seal plate 15 are engaged in sealing fashion by the enlarged inflated end 24 which projects therebeneath. Test ports 26 and 27 communicate with the sides of the inflatable seal 22 and, as described in the aforementioned patent, permit a determination to be made prior to flooding the canal as to whether the seal is intact.

It will be noted in the aforementioned patent that the outer inflatable seal operates in a very similar manner between the outer edge of the prior art seal plate and the embedment plate itself which defines the cavity ledge. In order to provide sufficient space for inflation of the lower end of the outer inflatable seal it has been necessary to cut a notch in the concrete wall of the cavity immediately beneath the cavity ledge. It will also be recognized that if the embedment plate is not concentric with the reactor flange the outer inflatable seal will be inoperative.

To avoid these problems the present invention provides a bearing plate 28 on the upper surface of the embedment plate 14 and a seal ring 29 on the upper surface of the seal plate 15. Both the bearing plate 28 and the seal ring 29 are flat and of the same thickness. They define opposed spaced circular respective concave and convex outer sealing surfaces and the concentricity of those sealing surfaces is exact regardless of any eccentricity between the seal and the seal plate 15 and the embedment plate 14.

An outer inflatable seal 31 is located between the bearing plate 28 and the seal ring 29 and operates in a manner similar to that of the inner inflatable seal 22. Thus it is suspended by a bracket 32 from the end of the standoff 18 and is associated with two test ports 33 and 34 in the manner of the test ports 26 and 27. It will be noted that the leveling screw similar to screw 20 is mounted on the upper surface of the bearing plate 28. The seal has an enlarged tapered first end 35 and an inflatable tubular second end 36. When the latter is inflated the end 35 is pulled into sealing engagement with the upper peripheries of the sealing ring 29 and bearing plate 28 and the end 36 is forced into sealing engagement with the lower peripheries of the seal ring 29 and the bearing plate 28.

Not only is the outer inflatable seal insured of functioning between exactly concentric opposed sealing surfaces by this construction but it is unnecessary to notch the upper edge of the cavity wall immediately beneath the ledge 13 as is necessary with the prior art structure.

While the invention has been described in relation to a nuclear reactor it will be apparent that it has applications to other environments as well. Variations may be made from the preferred embodiment described above; for example, those elements which are described as the bearing plate 28 and the sealing ring 29 could span the space between the flange 12 and the inner periphery of the seal plate 15. It is to be understood that the scope of the invention is defined not by the foregoing description but rather from the following claims.

I claim:

1. In a reactor cavity pool seal wherein a removable annular seal plate has an upper surface substantially co-planar with one of a cavity wall ledge and a reactor flange upper surface and has a circular edge surface spaced in opposition to a circular face beneath said one of the ledge and flange upper surface, and annular inflatable means are provided in effecting a seal between the spaced circular edge surface and face, the improvement which comprises
   (a) a flat seal ring on the seal plate, and
   (b) an annular bearing plate of the same thickness as the seal ring on one of the ledge and flange upper surface,
   (c) the seal ring and bearing plate defining opposed spaced circular respective inner and outer sealing surfaces,
   (d) the seal ring being fixed and sealed to the plate and the bearing ring being fixed and sealed to said one of the ledge and flange upper surface such that the inner and outer sealing surfaces are concentric,
   (e) said annular inflatable means being located between and operable against the opposed inner and outer sealing surfaces.

2. A reactor cavity pool seal according to claim 1 wherein second annular inflatable means are provided effecting a seal between (a) a second circular edge surface of said plate opposite that spaced in opposition to said circular face and (b) a second circular face beneath the other of said ledge and flange upper surface.

3. In a reactor cavity pool seal wherein a removable annular seal plate has an upper surface substantially co-planar with both a cavity wall ledge and a convex circular edge surface spaced in opposition to a concave circular face beneath said ledge, and annular inflatable means are provided in effecting a seal between the spaced circular edge surface and face, the improvement which comprises
   (a) a flat seal ring on the plate, and
   (b) an annular bearing plate of the same thickness as the seal ring on the ledge,
   (c) the seal ring and bearing plate defining opposed spaced circular respective convex inner and concave outer sealing surfaces,
   (d) the seal ring being fixed and sealed to the plate and the bearing plate being fixed and sealed to the ledge so that the inner and outer sealing surfaces are concentric,
   (e) said annular inflatable means being located between and operable against the opposed inner and outer sealing surfaces.

4. A reactor cavity pool seal according to claim 3 wherein second annular inflatable means are provided for effecting a seal between a concave circular edge surface of said plate opposite the convex circular sealing surface and a convex circular face beneath a reactor flange upper surface.

5. A reactor cavity pool seal according to claim 3 which further includes leveling means for adjusting the elevation of the seal plate so that its upper surface is substantially co-planar with the cavity wall ledge.

6. A reactor cavity pool seal according to claim 3 wherein said annular inflatable means comprises an enlarged tapered first end and an inflatable tubular second end, the first end being in contact with and projecting above an upper periphery of the circular sealing surfaces and the second end being tubular and inflatable and in contact with and projecting below a lower periphery of the circular sealing surfaces.

7. A reactor cavity pool seal according to claim 6 wherein the tubular second end of the inflatable means when inflated is spaced radially inwardly from the cavity wall.

* * * * *